United States Patent
Ruiz Lara et al.

(10) Patent No.: US 11,981,435 B2
(45) Date of Patent: May 14, 2024

(54) TEMPORARY CHANGING ROOM REUSING FLIGHT ATTENDANT SEAT AREA

(71) Applicant: Safran Seats USA LLC, Gainesville, TX (US)

(72) Inventors: Oscar Ruiz Lara, Versailles (FR); Arthur Glain, Boulogne-Billancourt (FR)

(73) Assignee: Safran Seats USA LLC, Gainesville, TX (US)

( * ) Notice: Subject to any disclaimer, the term of this patent is extended or adjusted under 35 U.S.C. 154(b) by 131 days.

(21) Appl. No.: 17/051,685

(22) PCT Filed: Jul. 31, 2018

(86) PCT No.: PCT/IB2018/055736
§ 371 (c)(1),
(2) Date: Oct. 29, 2020

(87) PCT Pub. No.: WO2019/224591
PCT Pub. Date: Nov. 28, 2019

(65) Prior Publication Data
US 2021/0245884 A1 Aug. 12, 2021

Related U.S. Application Data

(60) Provisional application No. 62/676,501, filed on May 25, 2018.

(51) Int. Cl.
*B64D 11/06* (2006.01)
*B64D 11/04* (2006.01)

(52) U.S. Cl.
CPC .......... *B64D 11/0606* (2014.12); *B64D 11/04* (2013.01); *B64D 11/0691* (2014.12)

(58) Field of Classification Search
CPC ............ B64D 11/0606; B64D 11/0691; B64D 11/0023; B64D 2011/0076
See application file for complete search history.

(56) References Cited

U.S. PATENT DOCUMENTS 2,809,379 A * 10/1957 Futran .................... A47K 3/325
4/609
5,024,398 A * 6/1991 Riedinger .......... B64D 11/0605
244/118.5

(Continued)

FOREIGN PATENT DOCUMENTS

CN 101220711 A * 7/2008 ............. A47K 3/325
DE 102015114382 A1 * 3/2017

(Continued)

OTHER PUBLICATIONS

International Patent Application No. PCT/IB2018/055736, International Preliminary Report on Patentability (Chapter I), dated Dec. 10, 2020.

(Continued)

*Primary Examiner* — Joshua J Michener
*Assistant Examiner* — Ryan Andrew Yankey
(74) *Attorney, Agent, or Firm* — Kilpatrick Townsend & Stockton LLP

(57) ABSTRACT

Described are temporary privacy modules for non-passenger seating areas of aircraft cabin arrangements. The temporary privacy modules selectively enclose a portion of the non-passenger seating areas. The temporary privacy modules include a support and a privacy device. The privacy device is movable relative to the support between a stowed position and a deployed position. In the deployed position, the privacy device encloses the portion of the non-passenger seating area and defines a temporary privacy room within the non-passenger seating area.

9 Claims, 5 Drawing Sheets

(56) References Cited

U.S. PATENT DOCUMENTS

| | | | |
|---|---|---|---|
| 6,257,523 B1 | 7/2001 | Olliges | |
| 10,800,532 B2 * | 10/2020 | Hall, Jr. | B60N 2/90 |
| 10,888,479 B1 * | 1/2021 | Gershon | A61G 3/008 |
| 2006/0065783 A1 * | 3/2006 | Mills | B64D 11/00 244/118.6 |
| 2010/0219292 A1 * | 9/2010 | Saint-Jalmes | B64D 11/0023 244/118.5 |
| 2011/0062283 A1 * | 3/2011 | Breuer | B64D 11/00 244/118.5 |
| 2011/0114788 A1 * | 5/2011 | Mosler | B64D 11/0023 244/118.5 |
| 2015/0008660 A1 * | 1/2015 | Griffard | B62B 3/025 280/651 |
| 2015/0053817 A1 * | 2/2015 | Wartena | B64D 11/04 244/118.6 |
| 2017/0009504 A1 * | 1/2017 | Colacecchi | A47H 1/04 |
| 2017/0129612 A1 | 5/2017 | Seibt et al. | |
| 2018/0099753 A1 * | 4/2018 | Hall, Jr. | B64D 11/0606 |
| 2018/0281963 A1 * | 10/2018 | Dowty | B64D 11/0606 |
| 2019/0039737 A1 * | 2/2019 | Chantal | B64D 11/0606 |
| 2021/0345780 A1 * | 11/2021 | Clough | B64D 11/0646 |

FOREIGN PATENT DOCUMENTS

| | | | |
|---|---|---|---|
| EP | 3309072 | 4/2018 | |
| EP | 3486172 A1 * | 5/2019 | |
| EP | 3848285 A1 * | 7/2021 | A47D 9/00 |
| FR | 3128202 A1 * | 4/2023 | |
| WO | 2012136327 | 10/2012 | |
| WO | WO-2013039904 A1 * | 3/2013 | B64D 11/00 |
| WO | WO-2016016027 A1 * | 2/2016 | B64D 11/0605 |

OTHER PUBLICATIONS

International Patent Application No. PCT/IB2018/055736, International Search Report and Written Opinion, dated Jun. 12-14, 2018.

* cited by examiner

US 11,981,435 B2

TEMPORARY CHANGING ROOM REUSING FLIGHT ATTENDANT SEAT AREA

CROSS REFERENCE TO RELATED APPLICATIONS

This application is related to and claims priority benefits from U.S. Provisional Application Ser. No. 62/676,501 ("the '501 application"), filed on May 25, 2018, entitled "TEMPORARY CHANGING ROOM REUSING FLIGHT ATTENDANT SEAT AREA." The '501 application is hereby incorporated in its entirety by this reference.

FIELD OF THE INVENTION

The field of the invention relates to cabin arrangements for aircraft, and, more particularly, to temporary privacy modules for non-passenger seating areas.

BACKGROUND

Passenger vehicles, such as airplanes, buses, ships, trains, etc., are increasingly able to travel over longer distances for longer durations of time. For example, some airplanes are able to travel on flights over 17 hours. During travel, and particularly for long-duration travel, various passenger needs may arise that a passenger would like to attend to in some degree of privacy. For example, on long haul flights, a passenger may wish to change her or his clothing, freshen up, change a child, etc.

Currently, due to cabin constraints, the only location that the passenger can address these needs is the lavatory. During long haul flights and/or on passenger vehicles with a large number of passengers, the number of lavatories is limited, and as such the availability of lavatories for lavatory needs is critical. As such, using the lavatory for these privacy needs reduces the availability of the lavatory for passengers who truly need to use the lavatory. Moreover, lavatories may become dirty over long duration travel, and using lavatories for privacy needs may be undesirable. As such, there is a need for an improved cabin arrangement that can provide passenger privacy in view of the cabin configuration and seating capacity constraints of the passenger vehicle.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft cabin arrangement includes a passenger seating area with at least one passenger seat, and a non-passenger seating area. The non-passenger seating area includes a temporary privacy module that is configured to selectively enclose a portion of the non-passenger seating area. The temporary privacy module includes a support and a privacy device supported by the support, and the privacy device is movable relative to the support between a stowed position and a deployed position. In the deployed position, the privacy device encloses the portion of the non-passenger seating area.

In some embodiments, the privacy device may include a privacy screen that is movable relative to the support to selectively enclose the portion of the non-passenger seating area. In various embodiments, the support may include a railing, and the privacy screen is movable along the railing between the stowed position and the deployed position. In certain embodiments, the temporary privacy module may be mounted on a fixed wall of the non-passenger seating area. In various aspects, the temporary privacy module may be a self-supporting within the non-passenger seating area and offset from a fixed wall of the non-passenger seating area.

In some embodiments, the temporary privacy module may be removably mounted in the non-passenger seating area such that a location of the portion of the non-passenger seating area selectively enclosed by the privacy device is adjustable within the non-passenger seating area. In various embodiments, the temporary privacy module may be fixedly mounted in the non-passenger seating area such that a location of the portion of the non-passenger seating area selectively enclosed by the privacy device is fixed within the non-passenger seating area. In various aspects, the non-passenger seating area may be a galley or a flight attendant seat area.

According to certain embodiments of the present invention, a non-passenger seating area for an aircraft cabin arrangement includes at least one fixed wall and a temporary privacy module. The temporary privacy module includes a support attached to the at least one fixed wall and a privacy device supported by the support and movable relative to the support between a stowed position and a deployed position. In the deployed position, the privacy device encloses a first portion of the non-passenger seating area relative to a second portion of the non-passenger seating area, and in the stowed position, the first portion is unenclosed relative to the second portion of the non-passenger seating area.

In some embodiments, the non-passenger seating area may include a galley or a flight attendant seat area for the aircraft cabin arrangement. In certain embodiments, the support may be fixedly mounted to the at least one fixed wall in the non-passenger seating area such that a location of the first portion of the non-passenger seating area selectively enclosed by the privacy device is fixed within the non-passenger seating area. In various aspects, the support of the temporary privacy module may be removably mounted to the at least one fixed wall in the non-passenger seating area such that a location of the first portion of the non-passenger seating area selectively enclosed by the privacy device is adjustable within the non-passenger seating area.

In various embodiments, the temporary privacy module may be a first temporary privacy module, and the non-passenger seating area may further include a second temporary privacy module that includes a second support and a second privacy device. The second privacy device may be supported by the second support and movable relative to the second support between a stowed position and a deployed position where, in the deployed position, the second privacy device encloses a third portion of the non-passenger seating area relative to the second portion of the non-passenger seating area, and, in the stowed position, the third portion is unenclosed relative to the second portion of the non-passenger seating area. In some examples, the support may include a railing, and the privacy device may include a privacy screen. In certain examples, the privacy device may be removable from the support when the privacy device is in the stowed position.

According to certain embodiments of the present disclosure, a non-passenger seating area for an aircraft cabin arrangement includes a fixed wall and a temporary privacy module. The temporary privacy module includes a support mounted on the fixed wall and a privacy device supported on the support and movable relative to the support between a stowed position and a deployed position. In the deployed position, the privacy device encloses a portion of the non-passenger seating area between the privacy device and the fixed wall and defines a temporary privacy room.

In some embodiments, the non-passenger seating area may include a flight attendant seat area for the aircraft cabin arrangement, and, in the deployed position, the privacy device encloses the portion of the flight attendant seat area comprising a flight attendant seat. In various embodiments, the support may be fixedly mounted to the fixed wall in the non-passenger seating area such that a location of the portion of the non-passenger seating area selectively enclosed by the privacy device is fixed within the non-passenger seating area. According to some embodiments, the support of the temporary privacy module may be removably mounted to the fixed wall in the non-passenger seating area such that a location of the portion of the non-passenger seating area selectively enclosed by the privacy device is adjustable within the non-passenger seating area. In various examples, the temporary privacy module may be a first temporary privacy module, and the non-passenger seating area may further include a second temporary privacy module. The temporary privacy module may include a second support mounted on the fixed wall and a second privacy device supported by the second support and movable relative to the second support between a stowed position and a deployed position. In some embodiments, in the deployed position, the second privacy device may enclose a second portion of the non-passenger seating area between the privacy device and the fixed wall and may define a second temporary privacy room.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a temporary privacy module for a non-passenger seating area of an aircraft cabin arrangement. The temporary privacy module selectively defines a temporary privacy room in a non-passenger seating area of the cabin arrangement that increases the functional workspace in the cabin without taking away from existing space typically or more frequently used by passengers during travel (e.g., a lavatory or other area). In certain aspects, the temporary privacy module maintains the functionality and/or availability of other areas of the cabin, provides a relatively clean area for privacy needs, does not require extra space within the cabin, does not require a lowering of the seating capacity within the cabin, and allows for the non-passenger seating area to remain useful. While the temporary privacy module is discussed for use with aircraft cabin arrangements, they are by no means so limited. Rather, embodiments of the temporary privacy module may be used in other cabin arrangements or other non-passenger seating areas or otherwise as desired.

Figure 1:
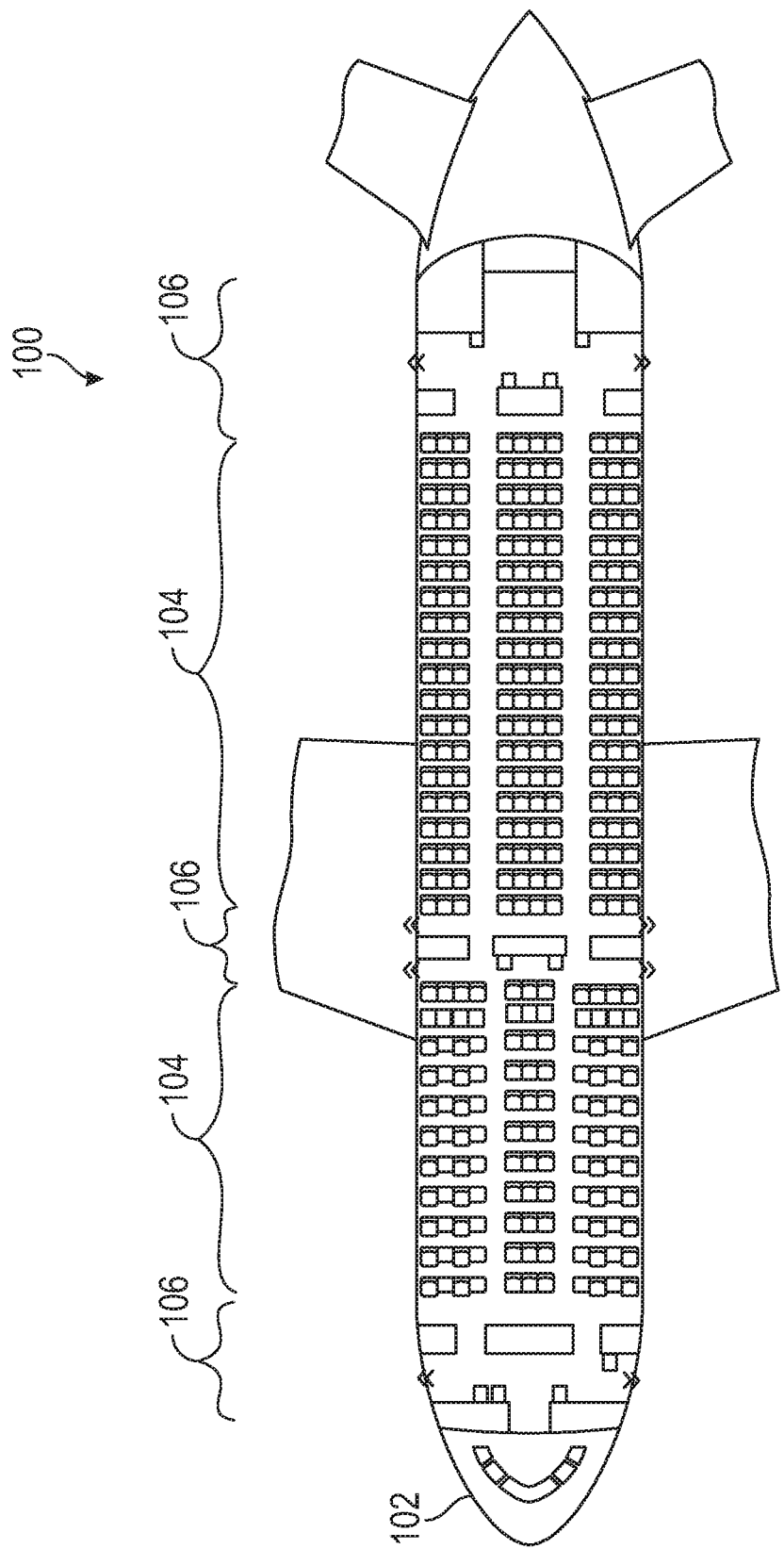
FIG. 1 is a schematic of an aircraft cabin arrangement according to certain embodiments of the present invention.

FIG. 1 illustrates an example of a cabin arrangement 100 for an aircraft 102. Although illustrated with the aircraft 102, it will be appreciated that the cabin arrangement 100 may be provided in various other passenger vehicles as desired. As illustrated in FIG. 1, the cabin arrangement generally includes one or more passenger seating areas 104. In some examples, the passenger seating areas are separated into various classes (e.g., first class, business class, economy class, etc.), although they need not be in other examples. In addition to the passenger seating areas 104, the cabin arrangement 100 may include one or more non-passenger seating areas 106. Non-passenger seating areas 106 are generally various areas within the cabin that are utilized by crew of the passenger vehicle (e.g., aircraft) but not necessarily the passengers. In some examples, the non-passenger seating areas may include a galley, a crew member taxiing, take-off, and landing (TTL) seat area, an ingress/egress area of the cabin near entry points of the cabin, etc. In various aspects, these non-passenger seating areas are commonly utilized during certain portions of travel. For example, the crew member TTL seat area may be used by a crew member during TTL of the aircraft, but otherwise may not be utilized during travel.

Figure 3:
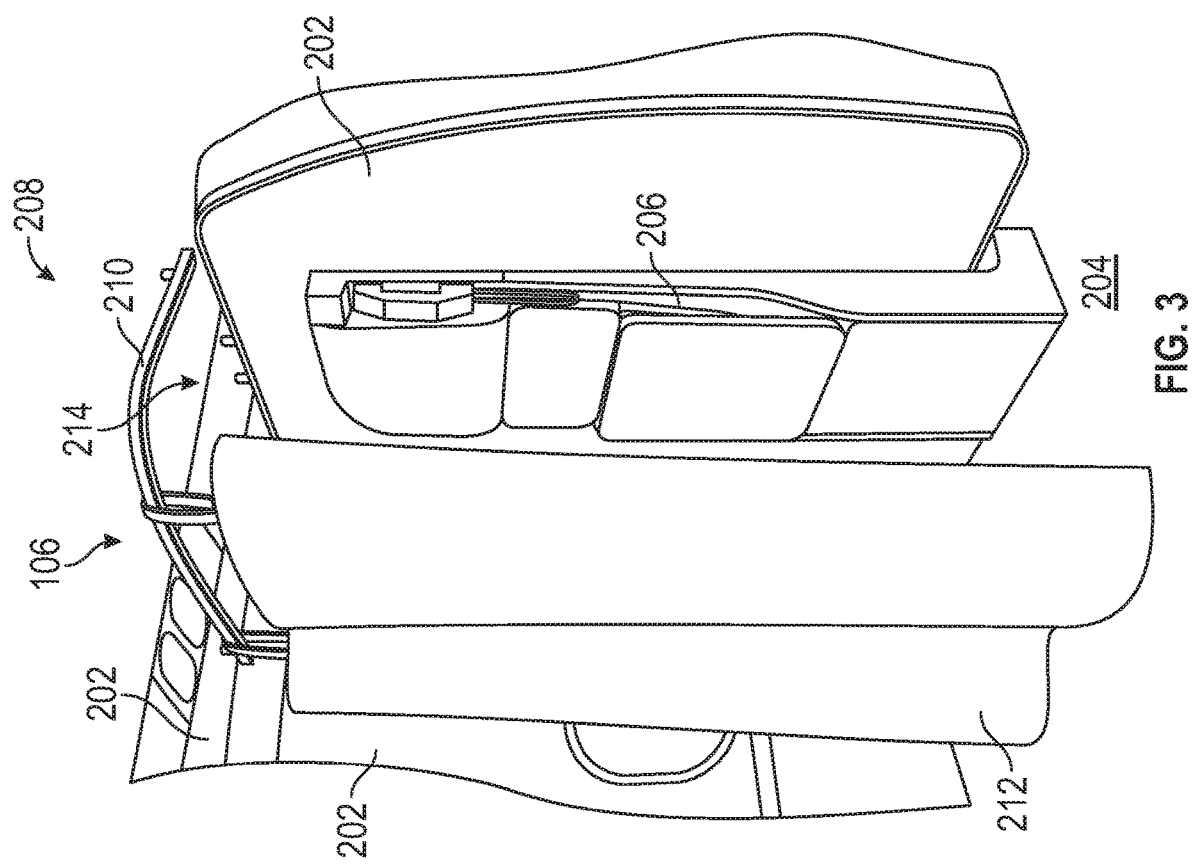
FIG. 3 is another perspective view of the non-passenger seating area and temporary privacy module of FIG. 2.
Figure 2:
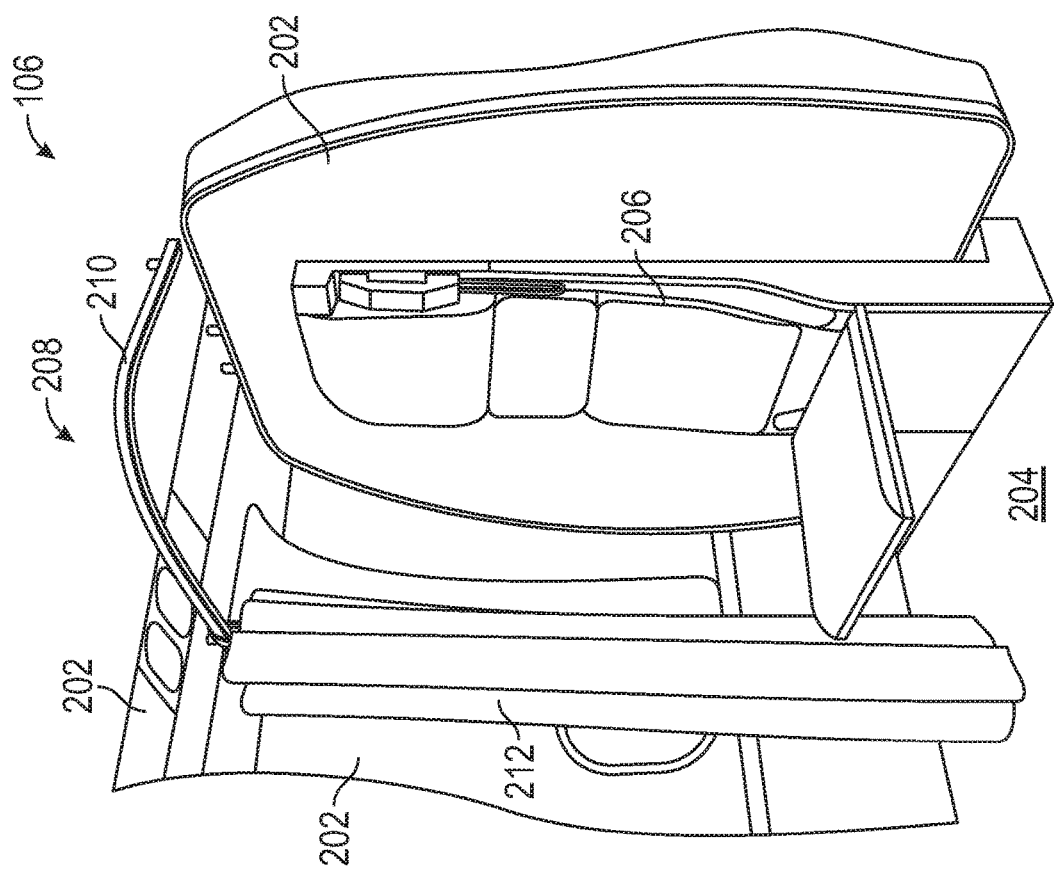
FIG. 2 is a perspective view of a non-passenger seating area of an aircraft cabin arrangement with a temporary privacy module according to certain embodiments of the present invention.

FIGS. 2 and 3 illustrate an example of a non-passenger seating area 106. As illustrated in FIGS. 2 and 3, the non-passenger seating area 106 includes at least one fixed wall 202 and a floor 204. In certain cases, the non-passenger seating area 106 includes a plurality of fixed walls 202. In various aspects, the at least one fixed wall 202 includes a cabin wall, a divider wall, or various other similar structures. In the example of FIGS. 2 and 3, the non-passenger seating area 106 is a crew member TTL seat area that includes at least one TTL seat 206 for the crew member.

According to certain embodiments of the present invention, as shown in FIGS. 2 and 3, a temporary privacy module 208 is provided with the non-passenger seating area 106. The temporary privacy module 208 includes a support 210 and a privacy device 212. As described in detail below, the temporary privacy module 208 selectively encloses a portion of the non-passenger seating area 106 to define a temporary privacy room 214 (see, e.g., FIG. 3). It will be appreciated that in examples where a cabin arrangement includes more than one non-passenger seating area 106, the temporary privacy module 208 can be provided in some of the non-passenger seating areas 106 or all of the non-passenger seating areas 106. In certain cases, a temporary privacy module can be moved between non-passenger seating areas 106 as desired and as described in detail below.

The support 210 supports the privacy device 212 in the non-passenger seating area 106 such that the privacy device 212 can be movable relative to the support 210. In various aspects, the support 210 may be various suitable supporting mechanisms including, but not limited to, support bars, railings, rollers, tracks, panels, various combinations thereof, or various other suitable mechanisms.

In some examples, the support 210 is fixedly mounted to at least one fixed wall 202. As one non-limiting example, the support 210 may be fixedly mounted to a cabin wall of the cabin and/or a divider wall of the cabin. In examples where the support 210 is fixedly mounted, the location of the temporary privacy room 214 within the non-passenger seating area 106 is fixed.

In other examples, the support 210 is removably mounted or supported within the non-passenger seating area 106. In such examples, the support 210 may be removably attached to at least one of the fixed walls 202 through various suitable removable mounting mechanisms. Removable mounting mechanisms may include, but are not limited to, hooks, pins, hook and loop fasteners, clips, clasps, or various other suitable mechanisms such that the support 210 can be selectively mounted within the non-passenger seating area 106. In other examples, the support 210 may be self-supporting such that the support 210 can be selectively positioned within the non-passenger seating area 106. As one example, the support 210 may be self-supporting such that the support 210 is selectively positioned on the floor 204 of the non-passenger seating area 106. In various aspects where the support 210 is removably mounted or supported, the fixed wall(s) 202 of the non-passenger seating area may optionally include a plurality of mounting locations to selectively engage the support 210. In examples where the support 210 is removably mounted or supported, the location of the temporary privacy room 214 within the non-passenger seating area 106 can be adjusted or changed as desired.

The privacy device 212 may be various suitable devices for selectively enclosing the portion of the non-passenger seating area 106 to define the temporary privacy room 214. In some cases, the privacy device 212 may be various devices or mechanisms including, but not limited to, privacy screens, foldable panels, rigid partitions, doors (rigid or flexible), various combinations thereof, or various other suitable devices or mechanisms.

The privacy device 212 is movably supported on the support 210. The privacy device 212 may be movably supported through various suitable mechanisms including, but not limited to, rollers, pins, hooks, loops, sliders, bearings, clips, clasps, or various other suitable mechanisms such that the privacy device 212 is movable relative to the support. In certain aspects, only a portion of the privacy device 212 is movably relative to the support 210; however, in other examples, the entire privacy device 212 is movable relative to the support 210.

As illustrated in FIGS. 2 and 3, the privacy device 212 is movable between a stowed position, which is illustrated in FIG. 2, and a deployed position. FIG. 3 illustrates the privacy device 212 in a partially deployed position such that the temporary privacy room 214 is partially defined. In the deployed position, the privacy device 212 encloses a portion of the non-passenger seating area 106 to define the temporary privacy room 214. In the example of FIGS. 2 and 3, in the deployed position, the temporary privacy room 214 is defined around the area of the TTL seat 206. In other examples, the temporary privacy room 214 may be defined in other portions of a non-passenger seating area 106 such as a galley, ingress/egress area of the cabin, etc. The temporary privacy room 214 may be utilized by a passenger without taking away from the functionality of other portions of the cabin such as a lavatory. As some examples, the temporary privacy room 214 may be used for changing an infant or small child, changing clothes, applying makeup, taking care of other personal needs, etc. The privacy device 212 may be stowed after use by the passenger and/or during particular travel conditions.

In some cases, the privacy device 212 is selectively removable from the support 210 through various suitable mechanisms including, but not limited to, hooks, pins, hook and loop fasteners, clips, clasps, or various other suitable mechanisms. In certain examples, the privacy device 212 may be selectively removable after the privacy device 212 is position in the stowed position, although it may be removable at other positions in other examples. In some cases, the privacy device 212 is selectively removable for further storage, stowing during particular travel situations (e.g., TTL situations or other determined situations), to change or replace the privacy device 212 with another privacy device 212, etc. In other examples, the privacy device 212 is permanently retained on the support.

Figure 5:
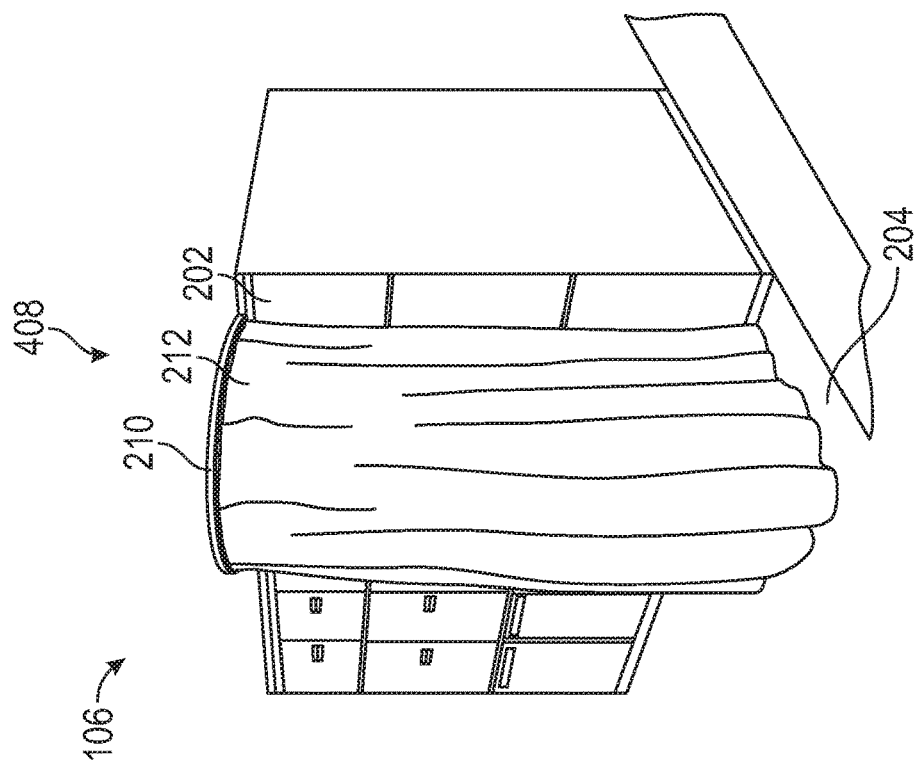
FIG. 5 is a perspective view of the temporary privacy module of FIG. 4 supported in a non-passenger seating area of an aircraft cabin arrangement.
Figure 4:
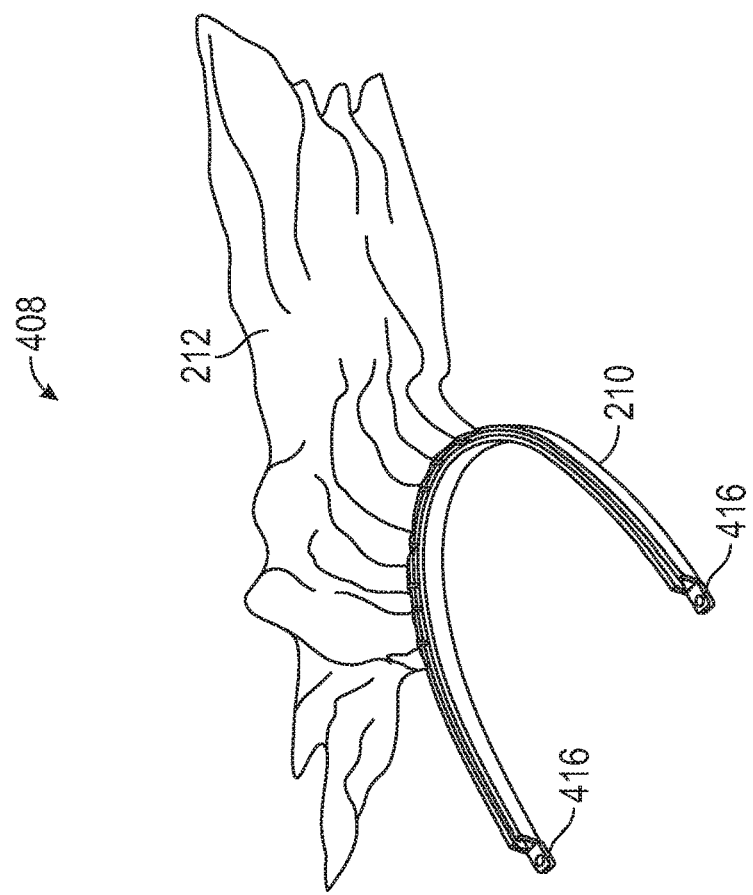
FIG. 4 is a perspective view of a temporary privacy module according to certain embodiments of the present invention.

FIGS. 4 and 5 illustrate another example of a temporary privacy module 408 in the non-passenger seating area 106. In the example of FIGS. 4 and 5, the non-passenger seating area 106 is a galley of the cabin arrangement. The temporary privacy module 408 is substantially similar to the temporary privacy module 208 except that the temporary privacy module 408 is removably supported in the non-passenger seating area 106 through support pins 416. In other words, the temporary privacy module is a "plug and play" privacy module that can be selectively installed or removed from various locations within the non-passenger seating area 106 such that the location of the temporary privacy room 214 can be changed as desired. Although support pins 416 are illustrated, in other examples, other mechanisms allowing for removable support of the temporary privacy module 408 may be utilized. The non-passenger seating area 106 may include one or more mechanisms that are engageable with the pins 416 or other suitable mechanisms such that the temporary privacy module 408 is removably supported.

Figure 7:
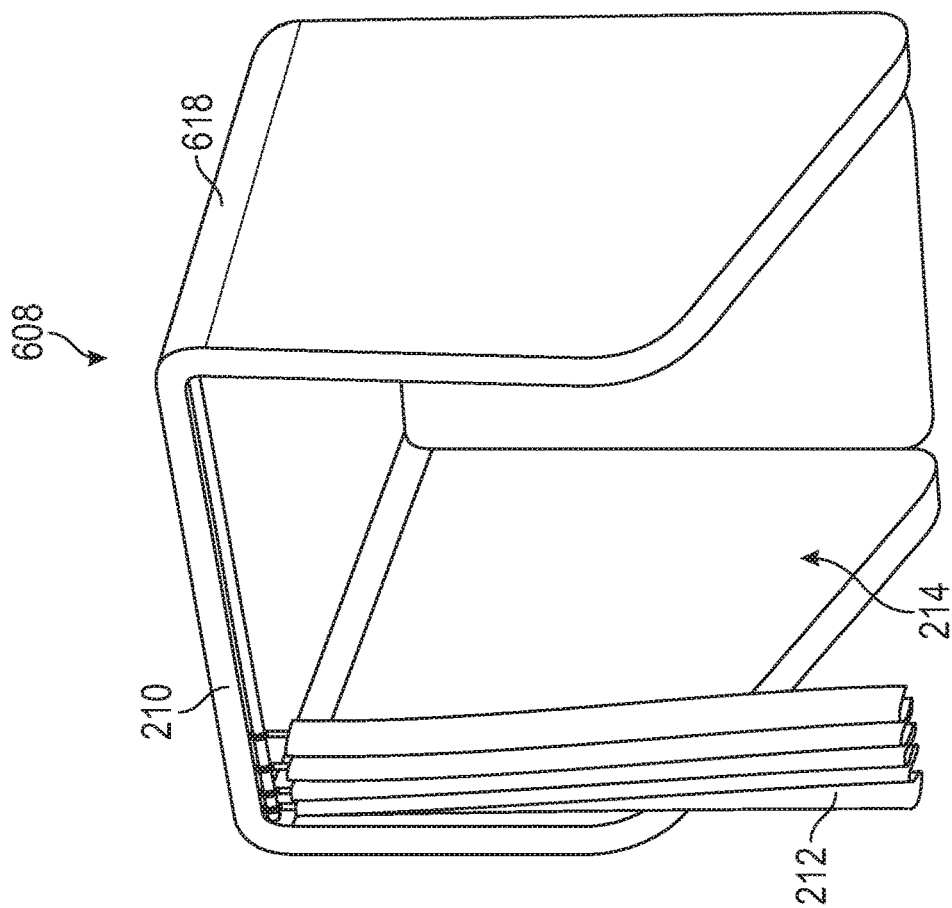
FIG. 7 is a perspective view of the temporary privacy module of FIG. 6 in an assembled configuration.
Figure 6:
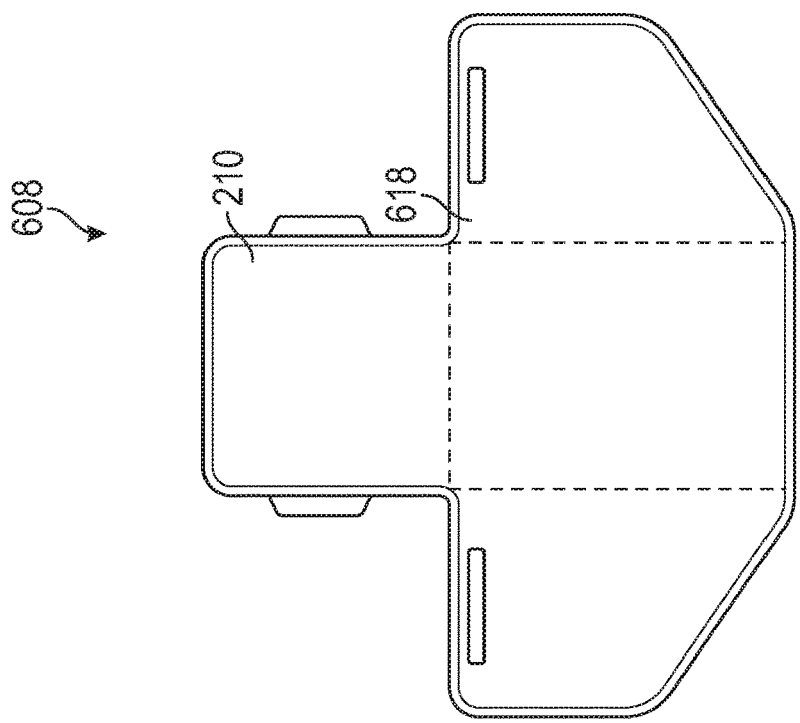
FIG. 6 is a top view of a temporary privacy module according to certain embodiments of the present invention in a disassembled configuration.

FIGS. 6 and 7 illustrate another example of a temporary privacy module 608. The temporary privacy module 608 is substantially similar to the temporary privacy module 208 except that the support 210 includes foldable panels 618 that at least partially define the temporary privacy room 214. In such examples, the privacy device 212 is movable relative to the foldable panels 618. Although the panels 618 are illustrated as foldable, in other examples, they need not be. The panels 618 may include various materials including, but not limited to, aluminum, stainless steel, aramid fibers, polycarbonate, polypropylene, other metallic materials, composite materials, or other similar materials. In other examples, the various combinations of rigid and flexible materials may be utilized as the support 210. For example, in some cases, the support 210 may include a combination of rigid panels (or other rigid materials) and a fabric, privacy screen, and/or other suitable flexible materials. In various examples, the temporary privacy module 608 may be assembled during travel (e.g., during a flight) or may be pre-assembled during travel. Similar to the other temporary privacy modules, the temporary privacy module 608 may be attached permanently or temporarily to various structures such as the floor 204, fixed wall 202, and/or may be free standing.

Figure 8:
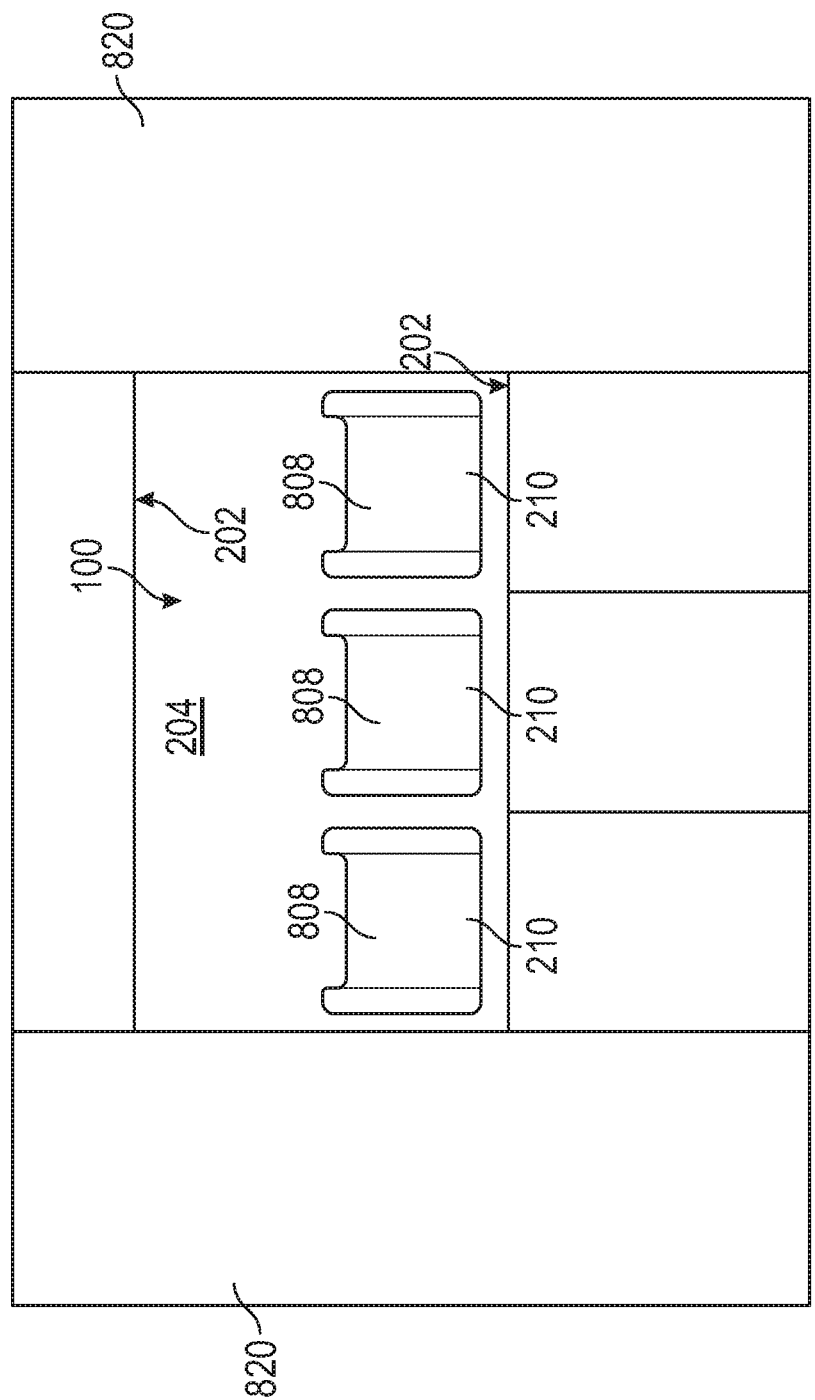
FIG. 8 is a schematic of a non-passenger seating area of an aircraft cabin arrangement with the temporary privacy module of FIG. 6.

FIG. 8 illustrates an example of a non-passenger seating area 106 with a plurality of temporary privacy modules 808. In the example of FIG. 8, the non-passenger seating area 106 is a galley of the cabin arrangement. In some aspects, the non-passenger seating area 106 may be accessed from a passenger seating area 104 by one or more aisles 820.

In the example of FIG. 8, three temporary privacy modules 808 are illustrated; however, in other examples, any number or temporary privacy modules 808 may be utilized. For example, the non-passenger seating area 106 may include one temporary privacy module 808, two temporary privacy modules 808, or more than three temporary privacy modules 808.

In the example of FIG. 8, the temporary privacy modules 808 are self-supporting such that the supports 210 and not supported on the fixed walls 202. In such examples, the temporary privacy modules 808 may be selectively positioned throughout the non-passenger seating area 106 or may be positioned at predefined locations. In other examples, the temporary privacy modules 808 may be similar to or different from the temporary privacy modules 208, 408, and/or 608. In some examples, the temporary privacy modules 808 are all the same type of privacy module (e.g., they have the same type of support 210 and privacy device 212). In other examples, various combinations of types of privacy modules may be utilized, and the privacy modules need not have the same type of support 210 and/or privacy device 212.

A method of installing and using a temporary privacy module is also disclosed. In some aspects, the method includes supporting the temporary privacy device in a non-passenger seating area of a cabin arrangement such as a galley, a TTL seat area, an ingress/egress area, etc. In certain cases, supporting the temporary privacy device includes fixedly mounting a support of the temporary privacy module in a non-passenger seating area of a cabin arrangement. In other aspects, supporting the temporary privacy device includes removably supporting the support of the temporary privacy module in the non-passenger seating area. In certain cases, the support may be removably supported prior to traveling or during travel. In some examples, the support is supported with the privacy device detached, and the privacy device is supported on the support after the support is supported in the non-passenger seating area. In other examples, the privacy device is pre-installed on the support prior to the support being supported in the non-passenger seating area.

Using the temporary privacy module may include moving the privacy device of the temporary privacy module device from the stowed position to the deployed position during travel such that the privacy device encloses a portion of the non-passenger seating area defines the temporary privacy room. In some aspects, the method includes moving the privacy device to the stowed position after a passenger has finished using the temporary privacy room and/or during certain travel situations (e.g., a TTL situation, during turbulence, or various other travel situations).

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. An aircraft cabin arrangement comprising: a passenger seating area comprising at least one passenger seat; and a non-passenger seating area comprising a temporary privacy module configured to selectively enclose a portion of the non-passenger seating area, the temporary privacy module comprising a support and a privacy device supported by the support, wherein the privacy device is movable relative to the support between a stowed position and a deployed position, and wherein, in the deployed position, the privacy device encloses the portion of the non-passenger seating area.

EC 2. The aircraft cabin arrangement of any of the preceding or subsequent examples, wherein the privacy device comprises a privacy screen that is movable relative to the support to selectively enclose the portion of the non-passenger seating area.

EC 3. The aircraft cabin arrangement of any of the preceding or subsequent examples, wherein the support comprises a railing, and wherein the privacy screen is movable along the railing between the stowed position and the deployed position.

EC 4. The aircraft cabin arrangement of any of the preceding or subsequent examples, wherein the temporary privacy module is mounted on a fixed wall of the non-passenger seating area.

EC 5. The aircraft cabin arrangement of any of the preceding or subsequent examples, wherein the temporary privacy module is a self-supporting within the non-passenger seating area and offset from a fixed wall of the non-passenger seating area.

EC 6. The aircraft cabin arrangement of any of the preceding or subsequent examples, wherein the temporary privacy module is removably mounted in the non-passenger seating area such that a location of the portion of the non-passenger seating area selectively enclosed by the privacy device is adjustable within the non-passenger seating area.

EC 7. The aircraft cabin arrangement of any of the preceding or subsequent examples, wherein the temporary privacy module is fixedly mounted in the non-passenger seating area such that a location of the portion of the non-passenger seating area selectively enclosed by the privacy device is fixed within the non-passenger seating area.

EC 8. The aircraft cabin arrangement of any of the preceding or subsequent examples, wherein the non-passenger seating area comprises a galley or a flight attendant seat area.

EC 9. A non-passenger seating area for an aircraft cabin arrangement, the non-passenger seating area comprising: at least one fixed wall; and a temporary privacy module comprising: a support attached to the at least one fixed wall; and a privacy device supported by the support and movable relative to the support between a stowed position and a deployed position, wherein, in the deployed position, the privacy device encloses a first portion of the non-passenger seating area relative to a second portion of the non-passenger seating area, and wherein, in the stowed position, the first portion is unenclosed relative to the second portion of the non-passenger seating area.

EC 10. The non-passenger seating area of any of the preceding or subsequent examples, wherein the non-passenger seating area comprises a galley or a flight attendant seat area for the aircraft cabin arrangement.

EC 11. The non-passenger seating area of any of the preceding or subsequent examples, wherein the support is fixedly mounted to the at least one fixed wall in the non-passenger seating area such that a location of the first portion of the non-passenger seating area selectively enclosed by the privacy device is fixed within the non-passenger seating area.

EC 12. The non-passenger seating area of any of the preceding or subsequent examples, wherein the support of the temporary privacy module is removably mounted to the at least one fixed wall in the non-passenger seating area such that a location of the first portion of the non-passenger seating area selectively enclosed by the privacy device is adjustable within the non-passenger seating area.

EC 13. The non-passenger seating area of any of the preceding or subsequent examples, wherein the temporary privacy module is a first temporary privacy module, and wherein the non-passenger seating area further comprises a second temporary privacy module comprising: a second support; and a second privacy device supported by the second support and movable relative to the second support between a stowed position and a deployed position, wherein, in the deployed position, the second privacy device encloses a third portion of the non-passenger seating area relative to the second portion of the non-passenger seating area, and wherein, in the stowed position, the third portion is unenclosed relative to the second portion of the non-passenger seating area.

EC 14. The non-passenger seating area of any of the preceding or subsequent examples, wherein the support comprises a railing, and wherein the privacy device comprises a privacy screen.

EC 15. The non-passenger seating area of any of the preceding or subsequent examples, wherein the privacy device is removable from the support when the privacy device is in the stowed position.

EC 16. A non-passenger seating area for an aircraft cabin arrangement, the non-passenger seating area comprising: a fixed wall; and a temporary privacy module comprising: a support mounted on the fixed wall; and a privacy device supported on the support and movable relative to the support between a stowed position and a deployed position, wherein, in the deployed position, the privacy device encloses a portion of the non-passenger seating area between the privacy device and the fixed wall and defines a temporary privacy room.

EC 17. The non-passenger seating area of any of the preceding or subsequent examples, wherein the non-passenger seating area comprises a flight attendant seat area for the aircraft cabin arrangement, and wherein, in the deployed position, the privacy device encloses the portion of the flight attendant seat area comprising a flight attendant seat.

EC 18. The non-passenger seating area of any of the preceding or subsequent examples, wherein the support is fixedly mounted to the fixed wall in the non-passenger seating area such that a location of the portion of the non-passenger seating area selectively enclosed by the privacy device is fixed within the non-passenger seating area.

EC 19. The non-passenger seating area of any of the preceding or subsequent examples, wherein the support of the temporary privacy module is removably mounted to the fixed wall in the non-passenger seating area such that a location of the portion of the non-passenger seating area selectively enclosed by the privacy device is adjustable within the non-passenger seating area.

EC 20. The non-passenger seating area of any of the preceding or subsequent examples, wherein the temporary privacy module is a first temporary privacy module, and wherein the non-passenger seating area further comprises a second temporary privacy module comprising: a second support mounted on the fixed wall; and a second privacy device supported by the second support and movable relative to the second support between a stowed position and a deployed position, wherein, in the deployed position, the second privacy device encloses a second portion of the non-passenger seating area between the privacy device and the fixed wall and defines a second temporary privacy room. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. An aircraft cabin arrangement comprising:
at least one fixed wall, wherein the fixed wall includes at least one mounting location;
a passenger seating area comprising at least one passenger seat; and
a non-passenger seating area comprising a temporary privacy module configured to selectively enclose a portion of the non-passenger seating area, the temporary privacy module comprising a support and a privacy device supported by the support, wherein the privacy device is movable relative to the support between a stowed position and a deployed position, and wherein, in the deployed position, the privacy device encloses the portion of the non-passenger seating area, wherein the support comprises a top panel, an aft panel extending downwards from an aft portion of the top panel, a first side panel extending downwards, and a second side panel extending downwards, wherein the top panel, the aft panel, the first side panel, and the second side panel together define a privacy room, and wherein a forward side of the support defines an opening providing access to the privacy room;
wherein the aft panel, the first side panel, and the second side panel are configured to be foldable relative to the top panel of the support such that the support is substantially flat when in the stowed position,
wherein the temporary privacy module is removably mounted in the non-passenger seating area such that a location of the non-passenger seating area selectively enclosed by the privacy module is adjustable within the non-passenger seating area, wherein the privacy module is configured to be assembled and mounted in the non-passenger seating area during travel and is further configured to be disassembled and dismounted in the non-passenger seating area and stowed when not in use, wherein the support comprises a railing removably attached to the top panel and wherein the railing is configured to extend between the first side panel and the second side panel when attached to the top panel and the temporary privacy module is in the deployed position, wherein the privacy device comprises a privacy screen which extends downwards from the railing and is movable along the railing between the stowed position and the deployed position, wherein in the deployed positioned the privacy screen covers the opening of the privacy room, and wherein the support includes at least one removable mounting mechanism configured to selectively engaged with the at least one mounting locations of the fixed wall to removably mount the support to the fixed wall.

2. The aircraft cabin arrangement of claim 1, wherein the temporary privacy module is configured to support its own weight within the non-passenger seating area on a floor of the non-passenger seating area and offset from a fixed wall of the non-passenger seating area.

3. The aircraft cabin arrangement of claim 1, wherein the non-passenger seating area comprises a galley or a flight attendant seat area.

4. A non-passenger seating area for an aircraft cabin arrangement, the non-passenger seating area comprising:
   at least one fixed wall, wherein the at least one fixed wall includes at least one mounting location; and
   a temporary privacy module comprising:
      a support attached to the at least one fixed wall; and
      a privacy device supported by the support and movable relative to the support between a stowed position and a deployed position,
      wherein, in the deployed position, the privacy device encloses a first portion of the non-passenger seating area relative to a second portion of the non-passenger seating area,
      wherein, in the stowed position, the first portion is unenclosed relative to the second portion of the non-passenger seating area,
      wherein the support comprises a top panel, an aft panel extending downwards from an aft portion of the top panel, a first side panel extending downwards, and a second side panel extending downwards, wherein the top panel, the aft panel, the first side panel, and the second side panel together define a privacy room, and wherein a forward side of the support defines an opening providing access to the privacy room,
      wherein the aft panel, the first side panel, and the second side panel are configured to be foldable relative to the top panel of the support such that the support is substantially flat when in the stowed position,
      wherein the support of the temporary privacy module is removably mounted to the at least one fixed wall in the non-passenger seating area such that a location of the portion of the non-passenger seating area selectively enclosed by the privacy device is adjustable within the non-passenger seating area,
      wherein the privacy module is configured mounted to the at least one fixed wall in the deployed position during travel and is further configured to be dismounted and transitioned to the stowed position when not in use,
      wherein the support comprises a railing removably attached to the top panel and wherein the railing is configured to extend between the first side panel and the second side panel when attached to the top panel and the temporary privacy module is in the deployed position,
      wherein the privacy device comprises a privacy screen which extends downwards from the railing and is movable along the railing between the stowed position and the deployed position, wherein in the deployed positioned the privacy screen covers the opening of the privacy room, and
      wherein the support includes at least one removable mounting mechanism configured to selectively engage with the at least one mounting locations of the fixed wall to removably mount the support to the fixed wall.

5. The non-passenger seating area of claim 4, wherein the non-passenger seating area comprises a galley or a flight attendant seat area for the aircraft cabin arrangement.

6. The non-passenger seating area of claim 4, wherein the temporary privacy module is a first temporary privacy module, and wherein the non-passenger seating area further comprises a second temporary privacy module comprising:
   a second support; and
   a second privacy device supported by the second support and movable relative to the second support between a stowed position and a deployed position,
   wherein, in the deployed position, the second privacy device encloses a third portion of the non-passenger seating area relative to the second portion of the non-passenger seating area, and
   wherein, in the stowed position, the third portion is unenclosed relative to the second portion of the non-passenger seating area.

7. A non-passenger seating area for an aircraft cabin arrangement, the non-passenger seating area comprising:
   a fixed wall, wherein the fixed wall includes at least one mounting location; and
   a temporary privacy module comprising:
      a support mounted on the fixed wall, wherein the support comprises a top panel, an aft panel extending downwards from an aft portion of the top panel, a first side panel extending downwards, and a second side panel extending downwards, wherein the top panel, the aft panel, the first side panel, and the second side panel together define a privacy room, wherein a forward side of the support defines an opening providing access to the privacy room, and wherein the aft panel, the first side panel, and the second side panel are configured to be foldable relative to the top panel of the support; and
      a privacy device supported on the support and movable relative to the support between a stowed position and a deployed position, wherein, in the deployed position, the privacy device encloses a portion of the non-passenger seating area between the privacy device and the fixed wall and defines a temporary privacy room,
      wherein the support of the temporary privacy module is removably mounted to the fixed wall in the non-passenger seating area such that a location of the portion of the non-passenger seating area selectively enclosed by the privacy device is adjustable within the non-passenger seating area, wherein the privacy module is configured to be assembled and mounted to the fixed wall during travel and is further configured to be disassembled and dismounted in the non-passenger seating area and stowed when not in use, wherein the support comprises a railing positioned adjacent to the top panel and extends between the first side panel and the second side panel such that the support is substantially flat when in the stowed position, wherein the support comprises a railing removably attached to the top panel and wherein the railing is configured to extend between the first side panel and the second side panel when attached to the top panel and the temporary privacy module is in the deployed position, and wherein the support includes at least one removable mounting mechanism configured to selectively engaged with the at least one mounting locations of the fixed wall to removably mount the support to the fixed wall.

8. The non-passenger seating area of claim 7, wherein the non-passenger seating area comprises a flight attendant seat area for the aircraft cabin arrangement, and wherein, in the deployed position, the privacy device encloses the portion of the flight attendant seat area comprising a flight attendant seat.

9. The non-passenger seating area of claim 7, wherein the temporary privacy module is a first temporary privacy module, and wherein the non-passenger seating area further comprises a second temporary privacy module comprising:
- a second support mounted on the fixed wall; and
- a second privacy device supported by the second support and movable relative to the second support between a stowed position and a deployed position,
- wherein, in the deployed position, the second privacy device encloses a second portion of the non-passenger seating area between the privacy device and the fixed wall and defines a second temporary privacy room.

\* \* \* \* \*